United States Patent Office 3,448,139
Patented June 3, 1969

3,448,139
PROCESS FOR THE PREPARATION OF γ-(NITROPHENYL)BUTYRONITRILES
William J. Farrissey, Jr., North Branford, Francesco P. Recchia, New Haven, and Adnan A. R. Sayigh, North Haven, Conn., assignors to The Upjohn Company, Kalamazoo, Mich., a corporation of Delaware
No Drawing. Filed May 19, 1965, Ser. No. 457,157
Int. Cl. C07c *121/66, 79/10*
U.S. Cl. 260—465                                                                                                   4 Claims

ABSTRACT OF THE DISCLOSURE

γ-(nitrophenyl)butyric acid alkyl esters and the corresponding nitriles are prepared by condensing the appropriate nitrophenylalkane and the appropriate (optionally alkyl or aryl-substituted) acrylonitrile or alkyl acrylate in the presence of a base (alkali metal hydroxide, alkali metal alkoxide of tetraalkyl ammonium hydroxide) and an aprotic polar solvent (N,N-dialkyl-alkanoamide, tetralkylurea, hexamethylphosphoramide, N-acetylmorpholine or N-acetylpiperidine). Typical is the condensation of p-nitrotoluene and acrylonitrile in the presence of sodium hydroxide and dimethylformamide to yield 4-(p-nitrophenyl)butyronitrile. Advantages of the novel process are simplicity of synthesis, from readily available starting materials, of compounds hitherto only available by more complex routes.

---

This invention relates to a novel process for the preparation of γ-arylbutyric acid and derivatives thereof and is more particularly concerned with a novel process for the preparation of γ-(nitrophenyl)butyronitriles, alkyl γ-(nitrophenyl)butyrates, and derivatives thereof.

The process of the invention in its broadest aspect comprises a process for the preparation of a compound having the formula:

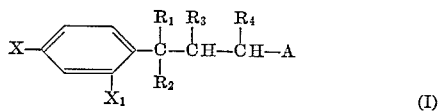

(I)

wherein $R_1$, $R_2$, $R_3$ and $R_4$ are each selected from the class consisting of hydrogen and lower-alkyl and one of $R_3$ and $R_4$ additionally represents aryl, A is selected from the class consisting of —CN and —COOR$_5$ wherein $R_5$ represents lower-alkyl, and X and $X_1$ are each selected from the group consisting of hydrogen and nitro, provided that both X and $X_1$ do not represent hydrogen simultaneously, which process comprises reacting a nitrophenylalkane having the formula:

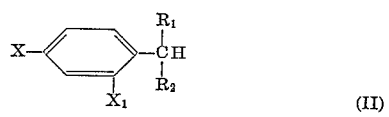

(II)

wherein X, $X_1$, $R_1$ and $R_2$ have the significance above defined, with an α,β-unsaturated compound having the formula:

(III)

wherein $R_3$, $R_4$, and A have the significance above defined, in the presence of a base and an aprotic, polar solvent.

The benzene nucleus of the compounds of Formulae I and II above can be substituted additionally by from one to three electron withdrawing groups. The term "electron withdrawing group" is well recognized in the art (see, for example, Organic Chemistry, D. J. Cram and G. S. Hammand, McGraw-Hill, 1959, p. 170), and is inclusive of quaternary amino, nitro, nitrato, cyano, carboxyl, carbalkoxy, N,N-dihydrocarbylcarboxamido, halo, acyl, nitroso, trifluoromethyl, and the like.

The term "lower-alkyl," as used throughout this specification and claims, means an alkyl group containing from 1 to 8 carbon atoms, inclusive, such as methyl, ethyl, propyl, butyl, pentyl, hexyl, heptyl, octyl, and isomeric forms thereof. The term "aryl," as used throughout the specification and claims, means the radical obtained by removing a hydrogen atom from an aromatic hydrocarbon, preferably one containing from 6 to 12 carbon atoms; examples of such aryl groups are phenyl, tolyl, xylyl, naphthyl, biphenyl, and the like.

The term "aprotic, polar solvent" is well recognized in the art, see, for example, Parker, Quarterly Reviews, 16, 163, 1962. Examples of this class of solvent are N,N-dialkyl hydrocarbon carboxylic amides such as N,N-dimethylformamide, N,N-diethylformamide, N,N-dimethylacetamide, N,N-diethylacetamide, N,N-dimethylpropionamide, N,N-diethylbutyramide, N,N-dipropyllauramide, N,N-diethyldecanamide, and the like; N,N,N′,N′-tetraalkylurea, such as N,N,N′,N′-tetramethylurea, N,N,N′,N′-tetraethylurea, and the like; hexamethylphosphoramide, N-acetylpiperidine, N-acetylmorpholine, and the like.

The compounds having the Formula I are, for the most part, known compounds which have been prepared hitherto by direct nitration of the corresponding compounds lacking the nitro group or groups in the benzene nucleus. The process of the invention provides a novel and advantageous method of preparing the compounds of Formula I from readily available starting materials.

The compounds having the Formula I are useful, for example, as intermediates in chemical synthesis. Illustratively the compounds of Formula I can be reduced, by methods well-known in the art for reduction of nitro to amino groups, to give the corresponding amines which are useful, in accordance with U.S. Patents 1,915,334 and 2,075,359 in forming amine fluosilicate mothproofing agents. In addition the compounds of Formula I are useful as intermediates in the preparation of the polyisocyanates having the formula

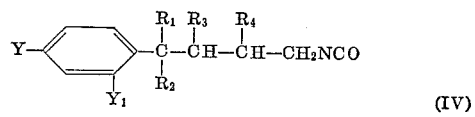

(IV)

wherein Y and $Y_1$ are selected from the class consisting of hydrogen and isocyanato, at least one of Y and $Y_1$ being isocyanato, and $R_1$, $R_2$, $R_3$ and $R_4$ are as hereinbefore defined.

The conversion of the compounds (I) to the polyisocyanates (IV) is accomplished illustratively as follows. In the case wherein the radical A in the compounds (I) represents —CN, the compounds (I) are subjected to reduction using procedures well-known in the art for the reduction of nitriles to the corresponding primary amines; the nitro group (or groups) in the benzene ring of (I) is also reduced simultaneously to an amino group (or groups). Representative methods of effecting this reduction are the use of sodium and alcohol and the use of catalytic hydrogenation, for example, using hydrogen in the presence of platinum oxide or palladium-on-charcoal; see, Chemistry of Carbon Compounds, edited by E. H. Rodd, vol. III, p. 488, Elsevier Publishing Company, New York, 1954.

In the case wherein A in the compound (I) represents —COOR$_5$, wherein $R_5$ is as hereinbefore defined, the latter group is first converted to —CN and then the above procedure is followed to obtain the above polyamine. The conversion of the carbalkoxy group to nitrile is accomplished by conventional procedures, for example, by hydrolysing the carbalkoxy group using aqueous mineral acid to give the corresponding acid, reacting this with ammonia to give the ammonium salt, heating this to give the amide and dehydration of the latter, for example, with phosphorus pentoxide to give the desired nitrile.

The conversion of the polyamine, obtained as described above, to the polyisocyanate (IV) is accomplished using conventional phosgenation techniques; see, for example, Siefkin, Annalen, 562, 75, 1949.

The polyisocyanates (IV) obtained as described above are useful in the preparation of polyurethane in accordance with procedures known in the art; see, for example, Dombrow, "Polyurethanes," Reinhold Publishing Corporation. New York, pp. 1–105 (1957). The polyisocyanates having the Formula IV possess the advantage that the reactivity, towards active hydrogen containing compounds, of the isocyanate group attached to the aliphatic chain is significantly lower than that of the isocyanate group (or groups) attached to the benzene nucleus. This difference in reactivity between the groups can be used to advantage in a number of ways. For example, it facilitates the production of polyurethanes having a more regular chain structure since the formation of the polyurethanes can be more readily controlled. In addition it is possible to prepare prepolymers by reaction of conventionally employed polyols with an excess of a polyisocyanate of Formula IV.

The prepolymers so obtained are stable on storage since they terminate in the more stable aliphatic isocyanato groups, the more reactive isocyanate groups attached to the benzene ring having taken part in formation of the prepolymer. Other advantages accruing from the differing reactivity of the isocyanate groups in the compounds (IV) will be apparent to those skilled in the art.

In carrying out the process of the invention the reactants (II) and (III) are brought together in any convenient manner in the presence of the base catalyst and the aprotic solvent. Advantageously, but not essentially, the unsaturated compound (III) is added to a preformed mixture of the nitrophenylalkane (II) and the base catalyst in the aprotic solvent. Said addition can be made in a single batch or can be made portionwise over a period of time. The latter is the preferred procedure.

The nitrophenylalkane (II) and the unsaturated compound (III) are employed advantageously in substantially stoichiometric proportions but an excess of either reactant can be employed if desired.

The reaction is conducted advantageously in the absence of atmospheric oxygen, i.e., the atmosphere above the reaction mixture is replaced by an inert gas such as nitrogen, argon, krypton, and the like and this inert atmosphere is maintained throughout the reaction.

The reaction can be carried out at temperatures within the range of about 0° C. to about 150° C., the lower portion of this range, namely between about 0° C. and about 50° C., being preferred. The most appropriate reaction time can vary from the order of minutes to the order of several hours, depending upon the nature of the reactants and the catalysts employed. The progress of the reaction can be followed using conventional techniques, for example, by infrared spectrographic analysis, and the appropriate time at which to terminate the reaction can be determined thereby.

The desired compound (I) is isolated from the reaction mixture by conventional techniques, for example, by neutralization of the base catalyst using acid such as a mineral acid, followed by evaporation of the solvent. The product so obtained can be purified by methods well known in the art such as chromatography, recrystallization in the case of solids, distillation in the case of liquids, and like techniques.

The base catalyst which is employed in the process of the invention is advantageously a strong base such as an alkali metal hydroxide, for example, sodium hydroxide, potassium hydroxide, lithium hydroxide, and the like; an alkali metal alkoxide, for example sodium methoxide, potassium methoxide, potassium ethoxide, potassium tertiary butoxide, and the like; and a quaternary ammonium hydroxide, for example, tetramethylammonium hydroxide, tetraethylammonium hydroxide, and the like. The amount of catalyst employed is generally within the range of about 1% to about 20% by weight based on amount of the nitrophenylalkane (II). Preferably the amount of catalyst employed is within the range of about 1% to about 5% by weight based on the amount of the nitrophenylalkane (II).

In addition to the aprotic solvent employed in the process of the invention, there can be present a second solvent which is non-polar and is inert under the conditions of the reaction. Examples of non-polar inert solvents are benzene, toluene, xylene, cyclohexane, petroleum ether, and the like, or mixtures thereof. Whether or not a second solvent is employed, the aprotic solvent is generally present in the reaction mixture in excess of molar proportions based on nitrophenylalkane (II). Preferably the aprotic solvent is present in considerable excess of this amount, of the order of 3 moles to about 30 moles per mole of nitrophenylalkane (II).

The following examples describe the manner and process of making and using the invention and set forth the best mode contemplated by the inventors of carrying out the invention but are not to be construed as limiting.

Example 1.—4-(p-nitrophenyl)butyronitrile

To a solution of 27.4 g. (0.2 mole) of p-nitrotoluene in 40 ml. of dimethylformamide was added, with stirring, 0.6 g. (0.015 mole) of freshly ground sodium hydroxide. The resulting mixture was stirred and a solution of 10.4 g. (0.2 mole) of acrylonitrile in 35 ml. of dimethylformamide was added slowly thereto over a period of one hour. During the addition the temperature of the reaction mixture rose to a maximum of 28° C. When the addition was complete the reaction mixture was stirred for a further two hours at room temperature (26° C.) and was then treated with 1.5 ml. of conc. hydrochloric acid. The mixture so obtained was filtered through diatomaceous earth and the filtrate was evaporated to dryness under reduced pressure. The residue was extracted with 250 ml. of hot chloroform and the chloroform extract was filtered. The filtrate was evaporated to dryness and the residue was extracted with a total of 200 ml. of hot petroleum ether (boiling range 30–60° C.). The petroleum ether-insoluble residue was distilled under reduced pressure to give 4-(p-nitrophenyl)butyronitrile in the form of a liquid having a boiling point of 169 to 173° C. at .6 to 1.0 mm. of mercury. The infrared absorption spectrum of this material showed absorption bands at $4.4\mu$ (CN), $6.55\mu$ ($NO_2$) and $7.39\mu$ ($NO_2$). The nuclear magnetic resonance spectrum of this material (in tetramethylsilane) was consistent with the assigned structure. The identity of the material was further confirmed by refluxing a mixture of 0.7 g. of the material, 3.5 ml. conc. sulfuric acid and 3 ml. of water for 0.5 hr. to give 0.66 g. (93% yield) of 4-(4-nitrophenyl)butyric acid having a melting point of 87 to 89° C., raised to 92 to 93° C. on recrystallization from toluene; Van der Scheer, J. Am. Chem. Soc. 56, 744, 1934, quotes 92 to 93° C. as the melting point of the above compound.

Example 2.—Methyl 2-methyl-4-(4-nitrophenyl)butyrate

A mixture of 13.7 g. (0.1 mole) of p-nitrotoluene, 10.01 g. (0.1 mole) of methyl methacrylate and 50 ml. of dimethylformamide was stirred under an atmosphere of nitrogen and 1.0 g. (0.025 mole) of freshly ground sodium hydroxide was added thereto. The resulting mixture was stirred for a further 1.25 hr. before being treated with 125 ml. of 5% hydochloric acid solution. The oil which separated was extracted with three 50 ml. portions of benzene and the benzene extracts were combined and dried over anhydrous magnesium sulfate. The dried solution was filtered and the filtrate was evaporated to remove the solvent. The residue was distilled to remove unreacted p-nitrotoluene boiling at 90 to 95° C. at 0.25 mm. of mercury. The undistilled residue was dissolved in a mixture of chloroform and petroleum ether and the solution was filtered through diatomaceous earth. The filtrate was evaproated to dryness and the residue was distilled in vacuo to give methyl 2-methyl-4-(4-nitrophenyl) butyrate in the form of a liquid. The infrared and nuclear magnetic resonance spectra were in agreement with the assigned structure.

Example 3.—4-(2,4-dinitrophenyl)butyronitrile

Using the procedure described in Example 1, but replacing p-nitrotoluene by 2,4-dinitrotoluene, there is obtained 4-(2,4-dinitrophenyl)butyronitrile.

Similarly, using the procedure described in Example 1, but replacing p-nitrotoluene by 1-ethyl-4-nitrobenzene, 1-ethyl-2-nitrobenzene, 1-isopropyl-4-nitrobenzene, 1-hexyl-2-nitrobenzene, and 1-octyl-4-nitrobenzene, there are obtained 4-(nitrophenyl)-3-methyl-, 4-(2-nitrophenyl)-3-methyl-, 3,3-dimethyl-4-(4-nitrophenyl)-, 4-(2-nitrophenyl)-3-pentyl-, and 4-(4 - nitrophenyl)-3-heptyl-butyronitrile, respectively.

Example 4.—2-methyl-4-(4-nitrophenyl)butyronitrile

Using the procedure described in Example 1, but replacing acrylonitrile by methacrylonitrile, there is obtained 2-methyl-4-(4-nitrophenyl)butyronitrile.

Similarly, using the procedure described in Example 1, but replacing acrylonitrile by crotononitrile, cinnamonitrile, 3,3-dimethyl - 2 - methylenebutyronitrile, 2-ethyl-3-methylcrotononitrile, 1-heptenenitrile, 2-phenylacrylonitrile, 2-p-tolyl-acrylonitrile and β-methylcinnamonitrile, there are obtained 3-methyl-4-(4-nitrophenyl)-, 4-(4-nitrophenyl)-3-phenyl-, 2-isopropyl-4-(4-nitrophenyl)-, 2-ethyl-3-methyl-4-(4-nitrophenyl)-, 4-(4 - nitrophenyl)-3-pentyl-, 4-(4-nitrophenyl)-2-phenyl-, 4-(4-nitrophenyl)-2-p-tolyl-, and 3-methyl-4-(4-nitrophenyl)-3-phenylbutyronitrile, respectively.

Example 5.—Ethyl 3-phenyl-4-(4-nitrophenyl)butyrate

Using the procedure described in Example 2, but replacing methyl methacrylate by ethyl cinnamate, there is obtained ethyl 3-phenyl-4-(4-nitrophenyl)butyrate.

We claim:
1. A process for the preparation of butyrontrile having the formula:

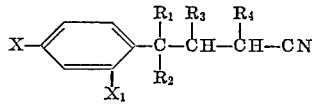

wherein $R_1$, $R_2$, $R_3$, and $R_4$ are each selected from the class consisting of hydrogen and lower-alkyl and one of $R_3$ and $R_4$ additionally represents aryl, and X and $X_1$ are each selected from the class consisting of hydrogen and nitro, provided that both X and $X_1$ do not represent hydrogen simultaneously, which comprises reacting, at about 0° C. to about 150° C., a nitrophenylalkane having the formula:

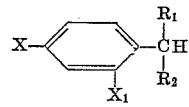

wherein X, $X_1$, $R_1$, and $R_2$ have the significance above defined with an α,β-unsaturated nitrile having the formula:

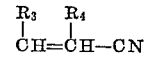

wherein $R_3$ and $R_4$ have the significance above defined, in the presence of a catalytic amount of a strong base selected from the class consisting of alkali metal alkoxide, alkali metal hydroxide, tetramethyl ammonium hydroxide, and tetraethyl ammonium hydroxide, and an aprotic polar solvent selected from the class consisting of N,N-di(lower-alkyl) substituted amides of alkanoic acids from 1 to 12 carbon atoms, inclusive, N,N,N',N'-tetra(lower-alkyl) ureas, hexamethylphosphoramide, N-acetylpiperidine, and N-acetylmorpholine.

2. A process for the preparation of 4-(4-nitrophenyl) butyronitrile which comprises reacting, at about 0° C. to about 150° C., 4-nitrotoluene with acrylonitrile in the presence of a catalytic amount of a strong base selected from the class consisting of alkali metal alkoxide, alkali metal hydroxide, tetramethyl ammonium hydroxide, and tetraethyl ammonium hydroxide, and an aprotic solvent selected from the class consisting of N,N-di(lower-alkyl) substituted amides of alkanoic acids from 1 to 12 carbon atoms, inclusive, N,N,N',N'-tetra(lower-alkyl)ureas, hexamethylphosphoramide, N-acetylpiperidine and N-acetylmorpholine.

3. The process of claim 2 wherein the strong base is an alkali metal hydroxide.

4. The process for the preparation of 4-(4-nitrophenyl) butyronitrile which comprises reacting, at about 0° C. to 150° C., 4-nitrotoluene with acrylonitrile in the presence of a catalytic amount of an alkali metal hydroxide, and dimethylformamide.

References Cited
UNITED STATES PATENTS
2,721,885 10/1955 Pines et al. _____ 260—465 XR CHARLES B. PARKER, *Primary Examiner.*

D. H. TORRENCE, *Assistant Examiner.*

U.S. Cl. X.R.

117—138.5; 260—2.5, 77.5, 453, 471, 570.5, 570.8, 999